United States Patent Office 3,502,774
Patented Mar. 24, 1970

3,502,774
ANTHELMINTIC METHOD USING 6-METHOXY-1-PHENAZINOL 5,10-DIOXIDE
Emanuel Grunberg, North Caldwell, N.J., assignor to Hoffmann-La Roche Inc., Nutley, N.J., a corporation of New Jersey
No Drawing. Filed May 26, 1967, Ser. No. 641,463
Int. Cl. A01n 9/22, 9/00
U.S. Cl. 424—250                             1 Claim

ABSTRACT OF THE DISCLOSURE

Pharmaceutical compositions containing 6-methoxy-1-phenazinol 5,10-dioxide and methods for the treatment of helminthiasis.

BRIEF DESCRIPTION OF THE INVENTION

This invention relates to novel pharmaceutical compositions and their use in the control and treatment of helminthiasis in warm blooded animals. More particularly, this invention relates to novel pharmaceutical compositions containing 6-methoxy-1-phenazinol 5,10-dioxide.

DETAILED DESCRIPTION OF THE INVENTION 6-methoxy-1-phenazinol 5,10-dioxide has unexpectedly been found to be active against parasitic worms. For example, it has been found to be particularly effective against *Hymenolepis nana*, the dwarf tapeworm which infects mice and humans. It is also effective against the pinworm *Syphacia obvelata*, an intestinal nematode most commonly found in rodents and whose accidental contamination causes human infection. According to this invention, it has been found that 6-methoxy-1-phenazinol 5,10-dioxide can effectively be employed for the reduction or elimination of worms in warm blooded animals.

Thus a comprehensive embodiment of the present invention comprises the use of 6-methoxy-1-phenazinol 5,10-dioxide for freeing animals from infections by parasitic worms. The use of preparations containing 6-methoxy-1-phenazinol 5,10-dioxide or the inclusion of 6-methoxy-1-phenazinol 5,10-dioxide in the diet of animals to combat worm infection constitutes a preferred embodiment. In another particular embodiment, the present invention provides pharmaceutical compositions which contain 6-methoxy-1-phenazinol 5,10-dioxide and which are suited for oral administration.

The invivo anthelmintic activity of 6-methoxy-1-phenazinol 5,10-dioxide has been demonstrated by biological tests in mice as follows:

Activity against *Hymenolepis nana*

Groups of six (6) mice were infected with 1.0 ml. of a washed pooled suspension containing approximately 1,000 eggs obtained by blending the posterior third of matured tapeworms obtained from the small intestines of mice infected two weeks earlier. Two weeks after infection the mice were treated orally, daily for three consecutive days. Mice were sacrificed one day after the last treatment and the small intestines examined for adult worms. The $CD_{50}$ value obtained for 6-methoxy-1-phenazinol 5,10-dioxide in this test was 138 mg./kg. (calculated according to the method of Reed and Muench, Am. J. Hyg., 1938, vol. 27, page 493).

Activity against *Syphacia obvelata*

Groups of six (6) mice harboring a natural infestation as ascertained by microscopic examinations of a "scotch tape" preparation from the perianal region were treated once orally for three consecutive days and sacrificed one day after the last treatment. The cecum of each animal was then removed and examined for the presence or absence of adult pinworms. The $CD_{50}$ value obtained for 6-methoxy-1-phenazinol 5,10-dioxide in this test was 586 mg./kg. (calculated according to the method of Reed and Muench, Am. J. Hyg., 1938, vol. 27, page 493).

When tested in vitro against worm stages, 6-methoxy-1-phenazinol 5,10-dioxide was active at 1–100 mcg./ml. which findings are summarized below:

| Helminth: | Minimum inhibitory concentration, mcg./ml. |
|---|---|
| *Hymenolepis nana* (adults) | 1 |
| *Ascaris suum* (larvae) | 100 |

The $LD_{50}$ for 6-methoxy-1-phenazinol 5,10-dioxide determined by suspending the compound in one (1) percent carboxymethylcellulose and orally administering to mice one dose was determined to be >2,000 mg./kg. Since the compound is extremely atoxic when administered orally, it can be administered in high dosages thus providing an extremely effective means of combating intestinal helminthiasis by oral administration to warm blooded animals, particularly mice and humans, in both of which certain species of helminths for example, *Hymenolepis nana* (dwarf tapeworm) occurs naturally. This high degree of effectiveness indicated by the activity and low toxicity permits the use of 6-methoxy-1-phenazinol 5,10-dioxide in therapy by oral application in the same general manner as hexylresorcinol. This latter compound exhibits activity against helminths when administered to humans in doses of .6 to 1 g. 6-methoxy-1-phenazinol 5,10-dioxide and pharmaceutical compositions containing 6-methoxy-1-phenazinol 5,10-dioxide demonstrate a pattern of activity qualitatively similar to anthelmintics of known clinical efficacy and are useful as oral anthelmintic agents in the treatment of helminthiasis.

In general, 6-methoxy-1-phenazinol 5,10-dioxide can be readily prepared from the well-known antibiotic iodinine by methylation with dimethyl sulfate in the presence of alkali. This as well as other methods for the preparation of 6-methoxy-1-phenazinol 5,10-dioxide are set forth for example in Tetrahedron Letters No. 8, pp. 715–718, 1967.

6-methoxy-1-phenazinol 5,10-dioxide is a red crystalline solid relatively insoluble in water through soluble in organic solvents for example, in methanol at 1 mg./g. and in pharmaceutically acceptable solvents, for example, its solubility in polyethylene glycol 400 is 2.0 mg./g. and 0.35 mg./g. in polypropylene glycol.

For the treatment of helminthiasis, 6-methoxy-1-phenazinol 5,10-dioxide can be suitably formulated into the usual forms for oral administration. It can be formulated into tablets, capsules, and similar dosage forms convenient to oral administration. Good control can be obtained with the compositions of the persent invention by administering from 10 mg./kg. to 100 mg./kg. of animal body weight with the most desirable dosage ranging between about 20 mg./kg. and 50 mg./kg. of body weight.

The compound is formulated into the customary oral forms of medication with the usual pharmaceutical excipients suitable for orally administered compositions. The inert adjuvants which are suitable for this use in preparing the various dosage forms include liquid and solid inorganic or organic substances such as water, gelatin, lactose, starch, magnesium stearate, vegetable oils, polyalkylene and the like. When administering the compounds they can be used in combination with preservatives, stabilizers, wetting or emulsifying agents, salts for varying the osmotic pressure, buffers, etc. If desired, the compounds can be used also in admixture with other therapeutically valuable substances.

The oral compositions of this invention will ordinarily contain about 100 to 500 mg. of active material. The desired dosage can be obtained by administering several tablets or capsules where smaller amounts are incorporated in single dosage forms. The effective dosage will of course depend in all instances upon the severity and individual characteristic in each case. It will be understood that dosage forms concerning larger quantity of the active drug ingredient are encompassed by the scope of this invention and that such dosage forms can be administered more or less frequently than indicated heretofore. It will be understood that dosage forms containing inert admixtures in quantities which are greater or less than indicated heretofore are also encompassed by this invention.

The invention will be more fully understood from the following examples which are intended as illustrative of the invention and are not to be construed as a limitation hereof.

EXAMPLE 1

Pharmaceutically acceptable tablets containing varying concentrations of 6-methoxy-1-phenazinol 5,10-dioxide were prepared by mixing Avicel (microcrystalline cellulose manufactured by American Viscose Co., Marlsus Took, Pa.), carn starch, magnesium stearate and 6-methoxy-1-phenazinol 5,10-dioxide and passing the mixture through a Model D Fitzpatrick mill, using a No. 1A screen with hammers forward. After remixing tablets were compressed directly on a ½″ flat faced beveled edge punch at 650 mg. A sample tablet composition consists of the following:

|  | Mg./tablet |
|---|---|
| 6-methoxy-1-phenazinol 5,10-dioxide | 255.0 |
| Avicel | 340.0 |
| Corn starch | 50.0 |
| Magnesium stearate | 5.0 |
|  | 650.0 |

EXAMPLE 2

Pharmaceutically acceptable capsules containing varying concentrations of 6-methoxy-1-phenazinol 5,10-dioxide were prepared by combining lactose, corn starch, magnesium stearate and 6-methoxy-1-phenazinol 5,10-dioxide and passing the mixed powder through a Model D Fitzpatrick mill using a No. 1A screen with hammers forward. After releasing the mixed milled powders were filled into approximately two-piece hard-shell gelatin capsules with a fill weight of 350 mg. The composition of an illustrative capsule is given below:

|  | Mg./capsule |
|---|---|
| 6-methoxy-1-phenazinol 5,10-dioxide | 255.0 |
| Lactose | 45.0 |
| Corn starch | 45.0 |
| Magnesium stearate | 5.0 |
|  | 350.0 |

I claim:
1. The method of inhibiting parasitic helminths in digestive systems of warm-blooded animals afflicted with helminthiasis which comprises orally feeding the animal from 1 mg. to 100 mg. per kg. of body weight, 6-methoxy-1-phenazinol 5,10-dioxide.

References Cited

UNITED STATES PATENTS

| 2,891,062 | 6/1959 | Orsprung | 260—267 |
| 3,080,284 | 3/1963 | Bijloo et al. | 167—53 |

OTHER REFERENCES

Peterson, E. A., et al.: Canadian J. Microbiol. 12,221, 4/1966.

Edwards, O. E., et al.: Tetrahedron Letters No. 40, pp. 4867–70, 10/1966.

Weigele, M., et al.: Tetrahedron Letters No. 8, pp. 715–718, 1967.

ALBERT T. MEYERS, Primary Examiner

V. D. TURNER, Assistant Examiner

PO-1050
(5/69)

UNITED STATES PATENT OFFICE
CERTIFICATE OF CORRECTION

Patent No. 3,502,774  Dated March 24, 1970

Inventor(s) Emanuel Grunberg

It is certified that error appears in the above-identified patent and that said Letters Patent are hereby corrected as shown below:

Column 4, line 24   "1 mg."

should be:

10 mg.

SIGNED AND SEALED
DEC 1 - 1970

(SEAL)
Attest:

Edward M. Fletcher, Jr.
Attesting Officer

WILLIAM E. SCHUYLER, JR.
Commissioner of Patents